US012719203B1

(12) United States Patent
Welch

(10) Patent No.: US 12,719,203 B1
(45) Date of Patent: Aug. 25, 2026

(54) SPLIT STANDARD CONNECTORS FOR ELECTRICAL CABLES

(71) Applicant: Honeywell Federal Manufacturing & Technologies, LLC, Kansas City, MO (US)

(72) Inventor: Joshua Welch, Belton, MO (US)

(73) Assignee: Honeywell Federal Manufacturing & Technologies, LLC, Kansas City, MO (US)

(*) Notice: Subject to any disclaimer, the term of this patent is extended or adjusted under 35 U.S.C. 154(b) by 8 days.

(21) Appl. No.: 19/263,131

(22) Filed: Jul. 8, 2025

(51) Int. Cl.
*H01R 13/514* (2006.01)

(52) U.S. Cl.
CPC .................................. *H01R 13/514* (2013.01)

(58) Field of Classification Search
CPC .................................................... H01R 13/514
See application file for complete search history.

(56) References Cited

U.S. PATENT DOCUMENTS 5,102,353 A * 4/1992 Brunker ............. H01R 13/6471 439/108
2003/0132743 A1 7/2003 Langouet et al.
2004/0171312 A1* 9/2004 Sichner ................ H01R 13/514 439/701
2009/0142970 A1* 6/2009 Patel .................... H01R 13/514 439/712
2024/0393543 A1 11/2024 Maesoba et al.

FOREIGN PATENT DOCUMENTS

EP 0847107 A1 6/1998
EP 2499707 B1 9/2012
EP 3413402 A1 12/2018

* cited by examiner

*Primary Examiner* — Abdullah A Riyami
*Assistant Examiner* — Nader J Alhawamdeh
(74) *Attorney, Agent, or Firm* — Erise IP, P.A.

(57) ABSTRACT

Systems and methods for coupling modular components of a standard connector for electrical cables are disclosed. In some embodiments, a separable connector comprises modular components for individual manipulation and cable connection. The modular components each retain electrical contacts at least partially contained within a housing. A terminal portion of the electrical contacts is configured for the selective connection of an electrical cable at each of the modular components. Furthermore, the modular components are configured to detachably couple to one another via an attachment mechanism along at least one side of the modular component. Following wiring of the separable connector to electrical cables to form a connector-cable assembly, the modular components are detached and advanced independently through a conduit or other aperture for sufficient connector-cable assembly routing. Modular components are then reattached and configured for connection to a receiver or other downstream electrical system component.

20 Claims, 19 Drawing Sheets

SPLIT STANDARD CONNECTORS FOR ELECTRICAL CABLES

STATEMENT OF GOVERNMENT SUPPORT

This invention was made with government support under Contract No.: DE-NA-0002839 awarded by the United States Department of Energy/National Nuclear Security Administration. The government has certain rights in the invention.

BACKGROUND

1. Field

Embodiments of the current disclosure relate to standard electrical connectors. More specifically, embodiments of the current disclosure relate to split standard electrical connectors for electrical wiring through small enclosures. Additionally, embodiments of the current disclosure relate to split semi-custom electrical connectors for varied applications.

2. Related Art

Electrical connectors, a standard component of electrical circuits, are used to establish a continuous conductive flow path for electrical current. Specifically, electrical circuits utilize electrical connectors to form a temporary or permanent connection between a receiver and an electrical wire or electrical cable (i.e., a group of bundled electrical wires). Such connections are commonly housed within small conduits for protection and routing purposes of the cables in commercial and industrial settings at various operating temperatures, voltages, and impedances. Establishing safe and successful wiring of electrical connectors through these spatially constrained conduits is essential for electrical device usage. However, initial assembly and maintenance of these connections is often hindered by the size dissonance of a standard size electrical connector (e.g., a D-subminiature connector) and a spatially restricted conduit. In such instances, an electrical connector having a sufficient profile for downstream use exceeds the dimensions of the conduit's aperture through which the connector must be routed. The size disparity of the larger connector and the smaller conduit hinders the electrical circuit as direct insertion of electrical cables and their attached standard electrical connectors is prevented.

Consequentially, it is traditionally necessary to use a small, customized connector, such as a micro-miniature D-Sub connector, that is able to account for the spatial limitations a small conduit presents. These further miniaturized connectors limit the electrical connector profile employed in such spaces and may negatively impact the electrical system's connection reliability and stability. While a smaller profile may overcome the physical incompatibility issues that a too large connector profile poses, it may result in a greater amount of smaller electrical connectors required. These smaller and customized electrical connectors are recognized within industry as often being exponentially more expensive than a standard size electrical connector. As such, increasing the quantity of connectors required to achieve sufficient connection for electrical contacts creates an added financial limitation for user accessibility of connectors sufficiently accommodating the connector drive size requirements. Beyond added expense, a smaller profile may restrict the mating retention capacity and perpetuate minimized connectivity reliability. Smaller connectors also experience additional issues resulting from decreased durability and may require more frequent replacement or maintenance.

As such, what is needed are systems and methods for routing electrical cables and connector assemblies in small conduits or similar spatially constrained areas that obviate the need for small, customized connectors. Additionally, systems and methods for semi-custom electrical connector assemblies are needed for applications with diversified electrical connection types.

SUMMARY

Embodiments of the current disclosure solve the above-described problems and provide a distinct advance in the art by providing systems and methods for assembling and routing electrical cables and connectors through small conduits, such as those having a smaller aperture than the connector profile of the electrical cable and connector assembly. Specifically, embodiments of the current disclosure are directed towards enabling the use of standard electrical connectors, previously too large in size for compatibility with restricted apertures and paths, in electrical circuits with small conduits.

Embodiments of the present disclosure comprise a separable connector divided into modular components for individual manipulation. Particularly, an embodiment of the current disclosure may have modular components that each retain electrical contacts and terminal portions configured for selective connection. Furthermore, in an embodiment, the modular components are configured to detachably couple to one another via an attachment mechanism along at least one side of each modular components. Such embodiments are advantageous to the independent advanced of modular components through a conduit or other aperture to achieve user-desired connector routing.

Additionally, an embodiment of the current disclosure comprises a semi-custom separable connector. Connections between the modular components of the separable connector correspond with the description of the above embodiment; however, the semi-custom connector features a combination of terminal contacts that differ in type or configuration across the face of the individual modular components. Such flexibility in functionality may be particularly useful in applications requiring connection to various receivers with differing electrical signal, signal integrity, or power connection requirements. Thus, the disclosed embodiment can be leveraged for use in a wider array of electrical connector applications, increasing connection routing capacity of a single connector while maintaining the safety of the electrical circuit.

In some aspects, the techniques described herein relate to a separable connector for coupling electrical cables. The separable connector includes a first component including a first terminal contact layout, a second component including a second terminal contact layout, and an attachment mechanism, wherein the attachment mechanism detachably couples the first component to the second component of the separable connector.

In some aspects, the techniques described herein relate to a semi-custom and separable connector system. The system includes a first modular component. The first modular component includes a first terminal contact layout, and a first side including a first attachment configured for selective attachment. The system further includes a second modular component. The second modular component includes a second terminal contact layout, and a second side including a second attachment configured to receive the first attachment of the first side of the first modular component to selectively attach the first modular component to the second modular component. The first terminal contact layout of the system is distinct from the second terminal contact layout of the system.

In some aspects, the techniques described herein relate to a method for assembling and routing a separable connector including providing a first modular component and a second modular component of the separable connector. The first modular component includes a first surface, a first terminal contact layout, and a first side configured to detachably couple to the second modular component. The second modular component includes a second surface, a second terminal contact layout, and a second side configured to detachably couple to the first modular component. The method further includes routing the first modular component and the second modular component through a conduit. Once the first modular component and the second modular component are routed through the conduit, the method includes coupling the first modular component to the second modular component by an attachment mechanism.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1A:
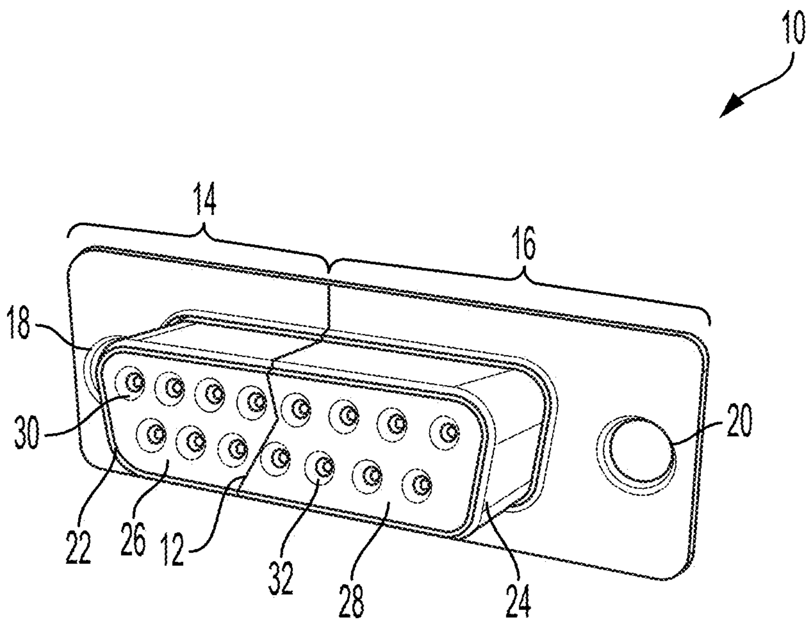
FIG. 1A depicts a front isometric view of an exemplary separable connector.

The drawing figures do not limit the invention to the specific embodiments disclosed and described herein. The drawings are not necessarily to scale, emphasis instead being placed upon clearly illustrating the principles of the invention.

DETAILED DESCRIPTION

The following description of embodiments of the invention references the accompanying illustrations that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense.

In this description, references to “one embodiment”, “an embodiment”, “embodiments”, “various embodiments”, “certain embodiments”, “some embodiments”, or “other embodiments” mean that the feature or features being referred to are included in at least one embodiment of the technology. Separate references to “one embodiment”, “an embodiment”, “embodiments”, “various embodiments”, “certain embodiments”, “some embodiments”, or “other embodiments” in this description do not necessarily refer to the same embodiment and are also not mutually exclusive unless so stated and/or except as will be readily apparent to those skilled in the art from the description. For example, a feature, structure, act, etc., described in one embodiment may also be included in other embodiments but is not necessarily included. Thus, the current technology can include a variety of combinations and/or integrations of the embodiments described herein.

Generally, embodiments of the current disclosure provide systems and methods for connecting electrical cables to cable connectors. More specifically, some embodiments of the current disclosure provide systems and methods for routing connector-cable assemblies having a standard electrical connector through small conduits or apertures. As used herein, a small conduit or aperture refers to the opening portion therethrough a protective enclosure designed to house electrical wires and cables that is smaller in diameter than the length of a standard cable connecter. It will be appreciated that embodiments of the present disclosure are not limited to assemblies with a cable connector length less than the diameter of a conduit and that, generally, any length cable connector may be used. Similarly, embodiments may also be directed toward routing cable assemblies through conduits or other apertures of any size.

It will be further appreciated that embodiments of the present disclosure are not limited only to use within small conduits or other spatially constrained or otherwise enclosed areas and that, generally, embodiments may be implemented into systems external to a conduit, enclosure, or other confined space. For instance, some embodiments may be directed to routing a connector-cable assembly with a standard cable connector at least partially on an elevated wire tray.

More specifically, some embodiments of the current disclosure are directed to a split connector and cable assembly (a connector-cable assembly). The split connector may be divisible across a traditionally unitary standard connector profile, creating a separable connector with distinct modular components for cable connection. Each modular portion of the connector may be independently manipulated via individual coupling to electrical wires of an electrical cable or cables, defining two distinct, permanent or temporary connections between electrical cables and the split standard connector. Because the separable connector can be split into modular portions, the split connector-cable assembly may be assembled prior to being pulled or otherwise routed through conduits. In some embodiments, the full connector-cable assembly includes each modular component coupled to the individual electrical wires of the cable. The modular components of the connector-cable assembly may be detached prior to independent routing through the conduit or other aperture configured for protection of the electrical system. Such detachment results in individual modular component-cable assemblies prepared for further manipulation.

Following routing of the independent modular component-cable assemblies, the modular portions may be attached, latched, or otherwise adjoined via a detachable coupling mechanism. Coupling the modular portions may secure the separable connector into a configuration and dimensionality aligned with that of the standard cable connector. Thus, embodiments of the separable connector may overcome spatial limitations without impacting the connector type or connector profile required for sufficient electrical connection, as the configuration of the standard connector is retained before subsequent connection to a receiver. Further, splitting the connector allows for a standard mate between one separate standard connector corresponding with the connection basis of a comparable non-split standard connector. Such a connection circumvents the need for incorporating multiple smaller, more expensive connectors into the electrical system to achieve a potentially less desirable connection.

Installed electrical connectors unavoidably necessitate periodic repair, partial replacement, or full replacement, and servicing the electrical connections requires disassembly of the electrical connectors. Such disassembly may interrupt the electrical circuit and corresponding connections. In some embodiments disclosed herein, the modular nature of the separable connector may more optimally facilitate the maintenance of the electrical connector. For instance, in an embodiment, a first portion of a failed or failing connector can be replaced without replacing the second portion. Isolating maintenance to a singular modular component in some embodiments may reduce the time required for maintenance and may otherwise allow for a more cost-effective maintenance approach, minimizing electrical circuit system downtime and reducing the quantity of connectors being replaced.

It will be appreciated that the term "standard" described herein relates to the connector electrical contact arrangements of a known type (e.g., a D-subminiature connector, an RF jack connector, etc.) rather than the separable connector in its entirety. Further, the term "standard" does not relate to the modular components beyond said connector electrical contact arrangement. For instance, the manner in which modular components may be selectively coupled to each other via an attaching mechanism has no relevance to the standard nature of the electrical contact arrangements of the separable connector.

Figure 1B:
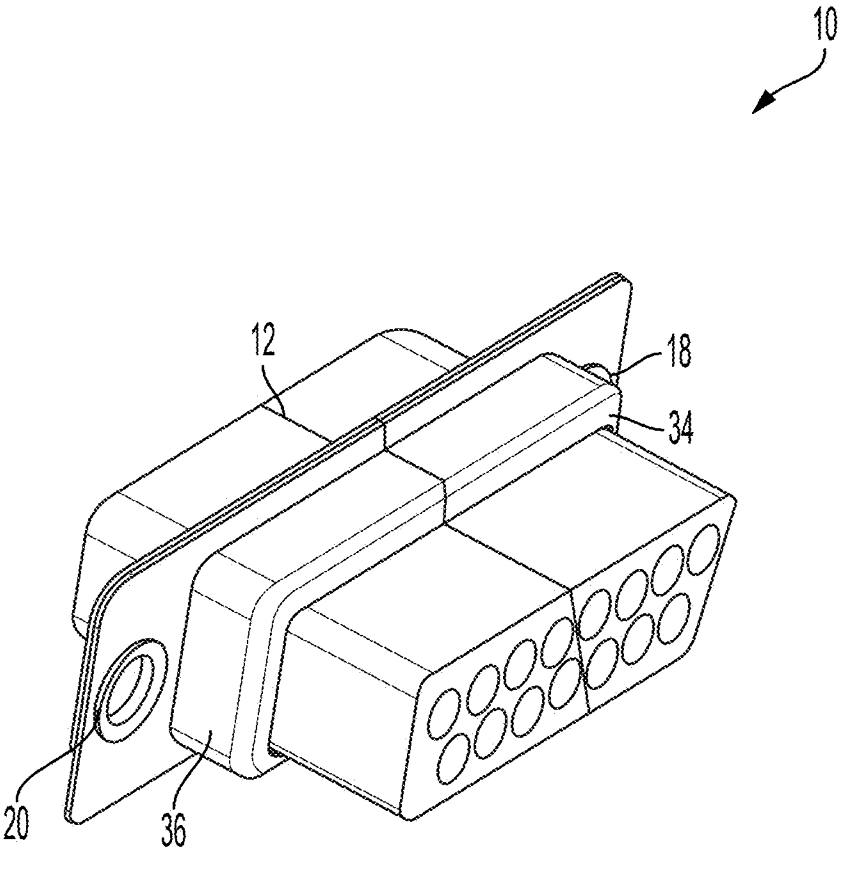
FIG. 1B depicts a back isometric view of the exemplary separable connector.
Figure 1C:
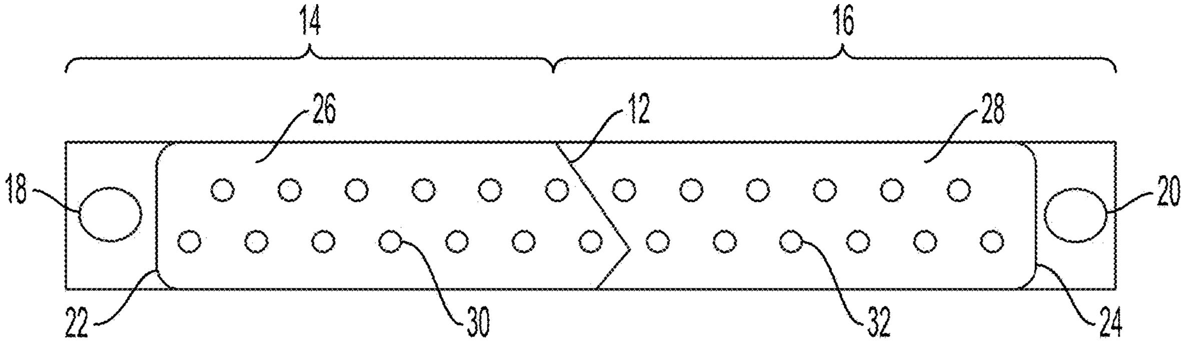
FIG. 1C depicts a front perspective view of the front face of the exemplary separable connector.

FIGS. 1A, 1B, and 1C illustrate a front isometric view, a back isometric view, and a front perspective view, respectively, of an example of separable connector 10 in accordance with embodiments of the present disclosure.

Separable connector 10 may be used to establish a temporary or permanent connection within an electrical circuit for electrical current, joining a cable (not shown) to a receiver (not shown) via a conductive path. The separable connector 10 may be modularly split at a break line 12. In some embodiments, the break line 12 may be singular in nature and vertical. A vertical instance of break line 12 may be straight and extend perpendicularly from the bottom edge of the separable connector 10 to the top edge of the separable connector 10. In other embodiments, the break line 12 may comprise multiple segments angled at various degrees with respect to one another. Specifically, the break line 12 of the embodiments disclosed herein may define the edge of a first modular component 14 and a second modular component 16 that are situated alongside one another. Alternatively, it will be appreciated that the break line 12 of some embodiments may be oriented such that separable connector 10 splits a separable connector 10 horizontally, such that a first modular component 14 is located on top of a second modular component 16 as opposed to the side-by-side configuration shown. In some embodiments, the proximity of the modular components 14, 16 may be maximized with break line 12 defining a first modular component 14 situated flush with at least a surface of the second modular component 16. Further still, in some embodiments, break line 12 may be oriented such that the modular components 14, 16 are offset some distance from one another while adjoined together rather than flush with at least one face of the other modular component. It will be appreciated that this offset may be any distance relevant to establishing adequate connection points with a receiver while maintaining a safe and reliable connection between the modular components 14, 16 and the electrical cables.

In some embodiments, the first modular component 14 and the second modular component 16 are distinctly separate and capable of independent manipulation for electrical cable connection purposes. It will be appreciated that other embodiments of separable connector 10 may include quantities of modular components exceeding a first modular component 14 and a second modular component 16. In some embodiments, there may be three modular components. In other embodiments, there may be four modular components, and so forth. The quantity of modular components may be selected for the desired configuration of electrical connection within an electrical system, especially as it pertains to sufficiency in size and safety parameters for connection to the electrical cable (not shown) and a downstream receiver (not shown). Some embodiments of the modular components 14, 16 may be manufactured in their entirety. In other embodiments, the modular components 14, 16 may alternatively be 3D printed.

The first modular component 14 may have a first mounting hardware feature 18 utilized to secure the first modular component 14 to a receiver, such as a panel, box, printed circuit board (PCB), wall, or other surface, in order to improve the reliability of the connection. The second modular component 16 may similarly include a second mounting hardware feature 20. In some embodiments, these mounting hardware features 18, 20 may utilize a circular connector mounting type, such as a two-hole flange with a hole at the center of the side of the modular components 14, 16, respectively. In other embodiments, the mounting hardware features 18, 20 may utilize a different mounting mechanism for securing the separable connector 10 to the desired receiver (i.e., a bulkhead mount, a board mount, a through-hole mount, a surface mount, etc.) without deriving from the scope herein. Still further, some embodiments may be friction fit to the standard receiver for electrical connection. The exemplary embodiment illustrated for separable connector 10 includes a first mounting hardware feature 18 and a second mounting hardware feature 20 configured with vertically oriented surfaces; however, it will be appreciated that embodiments herein may utilize mounting hardware features of various orientations. In some embodiments, the mounting hardware features 18, 20 may be oriented horizontally. In other embodiments, the mounting hardware features 18, 20 may be oriented at some angled variation between vertical and horizontal positions. Further, it will be understood that the orientation of the mounting hardware features 18, 20 may be dependent upon the location and orientation of the receiver or device to which it is mounted. In such cases, user manipulation of the separable connector 10 to adequately connect the separable connector 10 to a receiver will align the orientation of the mounting hardware 18, 20 with the orientation of the connection surface to the receiver.

Separable connector 10 contains a first housing 22 and a second housing 24 extending from the surface of the mounting hardware features 18, 20 such that each modular component has a corresponding housing 22, 24. Thus, the first housing 22 is located on the first modular component 14. Likewise, the second housing 24, is located on the second modular component 16. It will be appreciated that connectors with additional modular components exceeding a first modular component 14 and a second modular component 16 (e.g., a separable connector with a third modular component, a separable modular component with a fourth modular component, etc.) will have housing at each modular component. In some embodiments, the housing 22, 24 may be constructed of non-conductive, insulating material, such as molded plastics, for electrical insulation and isolation of the live electrical contacts. Other materials are within the scope hereof including, but not limited to, ceramic materials.

In some embodiments, the first housing 22 may extend distally from the surface of the first mounting hardware 18 to a first connector face 26. Likewise, the second housing 24 may extend distally from the surface of the second mounting hardware feature 20 to a second connector face 28. In some embodiments, the first and second housings 22, 24 extend the same distance from the surfaces of their corresponding mounting hardware 18, 20 such that the first connector face 26 and the second connector face 28 are distally aligned. While this is a common configuration for standard mating with receivers, it will be appreciated that some embodiments may include housings with connector faces 26, 28 of differing offset distances to provide differing connection points.

The housing of an electrical connector surrounds internal electrical contacts (not shown) and functions to ensure the stability of electrical connections and to protect electrical contacts from hazards such as short-circuiting or environmental concerns. In some embodiments, the modular components 14, 16 of separable connector 10 may comprise housings 22, 24 in which the electrical contacts are provided. Located at the connector faces 26, 28 are terminal portions of the electrical contacts, terminal contacts 30, 32 (alternatively, pins), providing a connection point between the electrical contacts housed internally to the housings 22, 24 and the receiver. In some embodiments, terminal contacts 30, 32 may comprise conductive metals such as copper. Terminal contacts 30, 32 may be constructed of other conductive materials without deriving from embodiments enclosed herein (i.e., carbon, silicon, etc.). Additionally, in some embodiments, the terminal contacts may be further plated with metals such as gold or tin for connection stability purposes.

At least one first terminal contact 30 may be configured on the first connector face 26 of the separable connector 10. Similarly, at least one second terminal contact 32 may be located on the second connector face 28 of the separable connector. As FIGS. 1A-1B depict, in some embodiments, terminal contacts 30, 32 may be of female orientation and structured as a receptacle. In such embodiments, the terminal contacts 30, 32 are hole-like connections contained within the housings 22, 24 and extending up to the connector faces 26, 28 for connection purposes. However, it will be appreciated that embodiments of the present disclosure are not limited to female socket metal terminal contacts and that, generally, any terminal contact configuration may be used for cable connection via the separable connector 10. In some embodiments, the terminal contacts 30, 32 may be of a male configuration and structured as an extruded pin. The quantity of terminal contacts 30, 32 may vary corresponding with the quantity of electrical contacts within the housing 22, 24 of the modular components 14, 16. For instance, there exist some embodiments of the current disclosure in which a modular component may have only one terminal contact. In other embodiments, however, there may be a plurality of terminal contacts across the connector face.

Terminal contacts 30, 32 may be oriented across the connector face 26, 28 in a terminal layout. The layout of the terminal contacts 30, 32, as well as the quantity of terminal contacts 30, 32 present on the separable connector 10, correspond to the size of the modular components 14, 16. For instance, a standard D-subminiature connector size, as depicted in FIGS. 1A-1C, is dependent upon the quantity of terminal contacts 30, 32 present on the standard connector. In some embodiments, separable connector 10 may be a standard D-subminiature configured connector that may have as few as nine terminal contacts 30, 32 (i.e., the DE-9 standard connector size) divided between two rows, an upper row of five terminal contacts 30, 32 and a bottom row of four terminal contacts 30, 32. In other embodiments, separable connector 10 is a standard D-subminiature connector that may have fifteen terminal contacts 30, 32 (i.e., the DE-15 standard connector size) divided between two rows, an upper row of eight terminal contacts 30, 32 and a bottom row of seven terminal contacts 30, 32. Similarly, in some embodiments, separable connector 10 may be a standard D-subminiature connector of DB-25 and DC-37 configurations in which the top row of terminal contacts 30, 32 have one more terminal contact 30, 32 than the bottom row, totaling twenty-five and thirty-seven terminal contacts 30 32, respectively. In another embodiment, the separable connector 10 may be a standard D-subminiature configured connector with a quantity of fifty terminal contacts 30, 32 (i.e., the DD-50 standard connector size) divided between three rows. In such an instance, the top and bottom rows comprise seventeen terminal contacts 30, 32, while the middle row has sixteen terminal contacts 30, 32. These standard sizes are designated to fit a specific number of terminal contacts 30, 32, for precise connection to various receivers or alternative applications. However, it will be appreciated that the quantity of terminal contacts may vary beyond the scope of a standard D-subminiature connector without deriving from the disclosure herein. It will be understood that any number of terminal contacts may be configured across the connector face 26, 28, and dispersed between any number of rows. In some embodiments, break line 12 may be nearly down the middle of the separable connector 10, dividing the terminal contacts 30, 32 as evenly as possible between the modular components 14, 16. In other embodiments, the break line may be oriented elsewhere on the separable connector 10 such that the terminal contacts 30, 32 on the separable connector 10 may be divided in any ratio between the two modular components 14, 16.

Furthermore, terminal contact type can further influence the quantity of terminal contacts present on an embodiment of the separable connector 10 and, thus, each modular component 14, 16. For instance, in some embodiments, terminal contacts 30, 32 are of a radio frequency (RF) jack type such as a coaxial RF type (e.g., micro-style RF terminal contacts, nano-style RF terminal contacts, etc.). Further, it will be appreciated that embodiments of separable connector 10 may have a myriad of terminal contact types beyond standard D-subminiature and RF Jack terminal contacts without deriving from the scope herein. These types may include, but are not limited to, contacts associated with push-pull connectors, high-density D-subminiature connectors, and circular connectors. In other embodiments, the terminal contacts 30, 32 may be utilized for high-speed data transmission and include terminal contact types such as USB Type-C, Thunderbolt, or HDMI terminal contacts 30, 32. Terminal contact type may also influence modular component shape. In some embodiments, the housings 22, 24 may be generically rectangular in shape, corresponding with a standard D-subminiature geometry, as shown. However, it will be appreciated that the connector modular components 14, 16 may take various other geometries (i.e., trapezoidal, circular, etc.) corresponding with both the configuration and type of terminal contacts 30, 32. The geometry of each modular component 14, 16 may further define the geometry of the break line 12 of the separable connector 10, such that modular components 14, 16 of varying shapes may connect to comprise a single instance of separable connector 10. Further, housing 22, 24 may be an alternative insulating body structure within which internal portions of terminal contacts 30, 32 are at least partially contained in a configuration that likewise isolates the live electrical contacts. In some embodiments, the housing 22, 24 may be surrounded by a shell for additional structural support.

As depicted in FIGS. 1A and 1C, in some embodiments, the separable connector 10 may have a first modular component 14 and a second modular component 16 with uniform terminal contact 30, 32 types on both the first connector face 26 and the second connector face 28 of the separable connector 10. For example, FIGS. 1A and 1C depict a separable connector 10 having a first modular component 14 and a second modular component 16, both with a first row and a second row of D-subminiature terminal contacts 30, 32.

FIG. 1B best depicts the back portion of an example of separable connector 10. Specifically, the break line 12 can be seen as extending from the front portion therethrough the entirety of the separable connector 10, including the back portion, to distinguish individual modular components 14, 16 from one another via a continuous split. Additionally, FIG. 1B illustrates the first backshell 34 and the second backshell 36 associated with the first modular component 14 and the second modular component 16, respectively. The backshells 34, 36 may provide a secure connection point for electrical cables and prevent the modular components 14, 16 of the separable connector 10 from unintended decoupling from the cable. Further, the backshells 34, 36 may provide mechanical support and strain relief for the cable. In some embodiments, the structure of the first backshell 34 may align with that of the first housing 22 structure. Similar alignment may occur between the second backshell 36 and the second housing 24. Other embodiments may incorporate a structure of backshells 34, 36 that varies from the configuration or overall shape of the housings 22, 24. It will be appreciated that, though the back shells are depicted in FIG. 1B are uniform and rectangular, in some embodiments, the back shells may be varying geometries (i.e., trapezoidal, round, etc.) in any combination between the first modular component 14 and the second modular component 16 without departing from the scope herein.

Figure 2A:
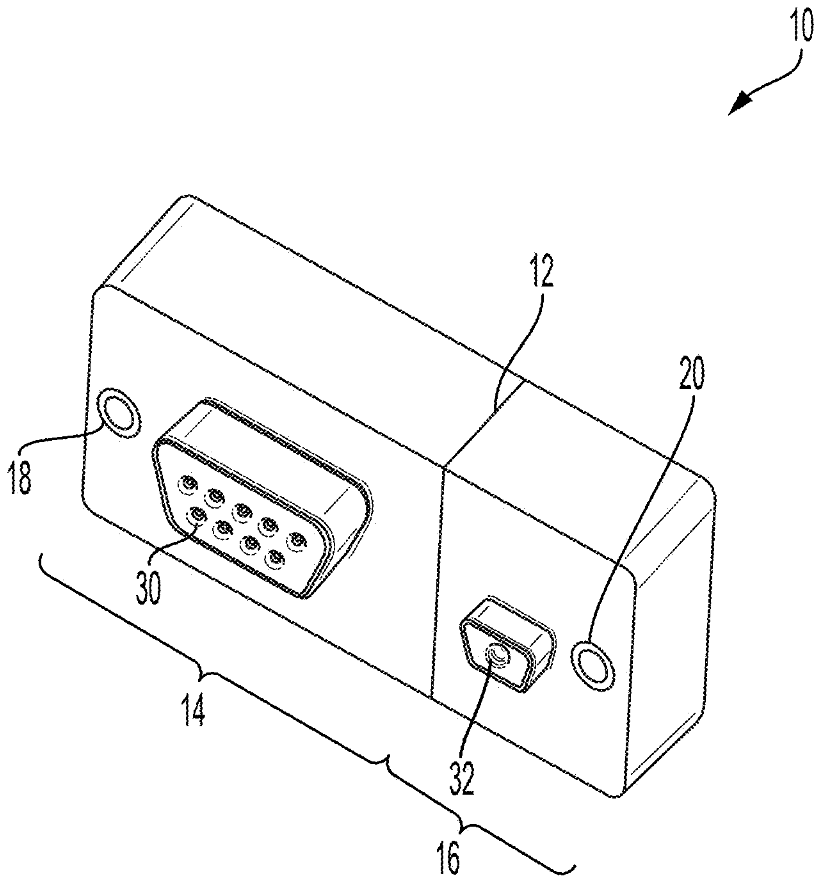
FIG. 2A depicts a front isometric view of the separable connector with coupled modular components.
Figure 2B:
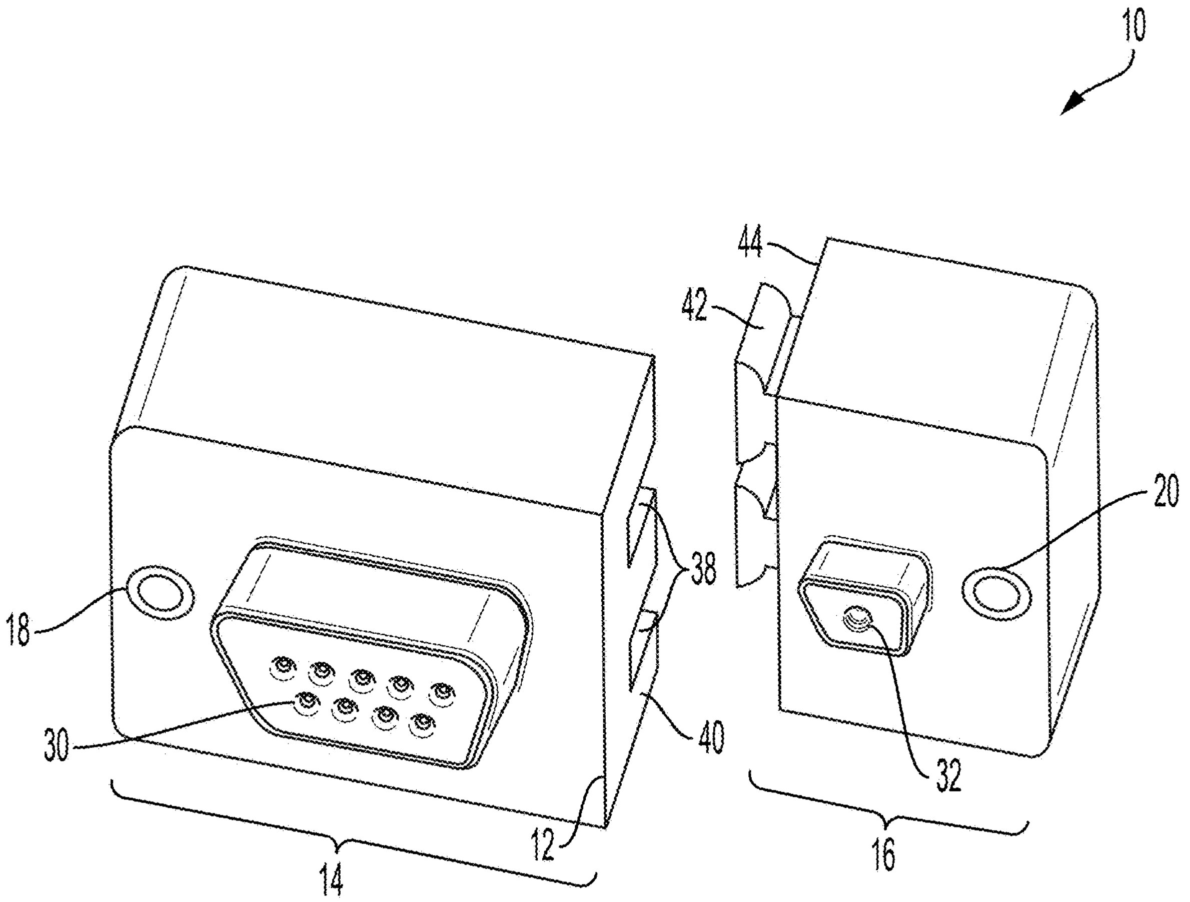
FIG. 2B depicts a front isometric view of the separable connector with uncoupled modular components.
Figure 2C:
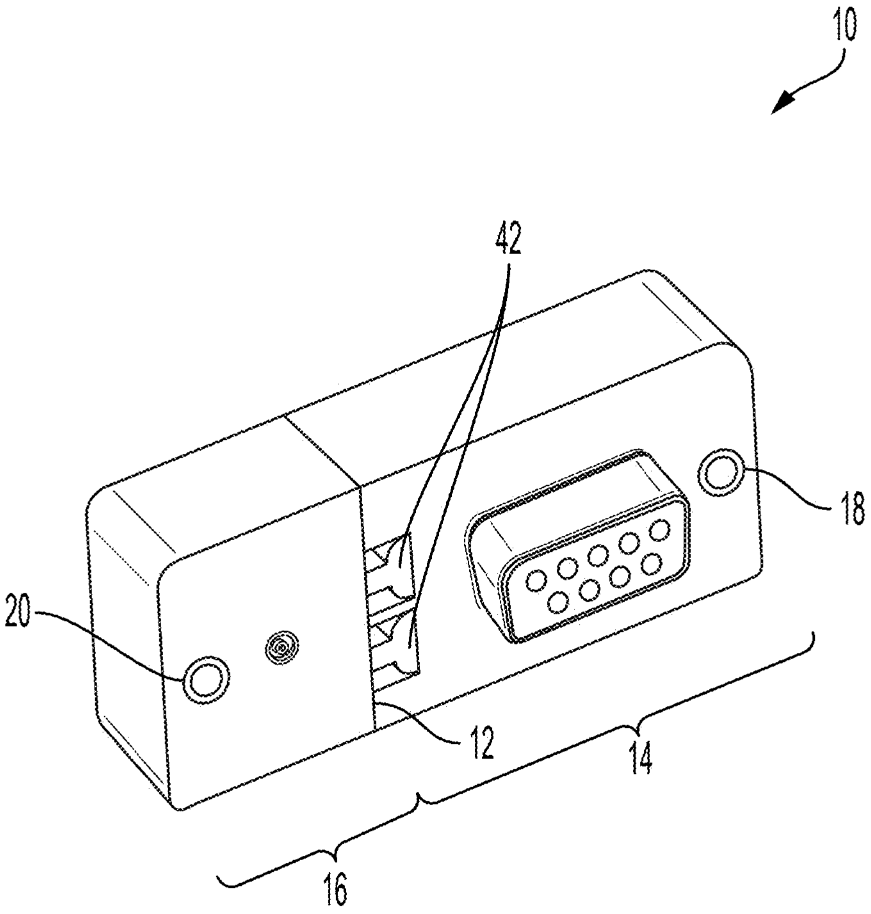
FIG. 2C depicts a back perspective view of the separable connector with coupled modular components.

Turning now to FIGS. 2A, 2B, and 2C, an embodiment of a separable connector 10 that is a semi-custom example of separable connector 10 is depicted. FIG. 2A specifically illustrates a front isometric view of an embodiment of the semi-custom example of separable connector 10 in which the break line 12 divides a first modular component 14 from a second modular component 16. The semi-custom example of separable connector 10 may be customizable on at least one modular component 14, 16 such that the terminal contacts are distinct and varied from the first modular component 14 to the second modular component 16 in quantity and pin type. Here, modular component 14 features traditional D-subminiature terminal contacts 30, and modular component 16 has female micro-miniature D-sub connector shape with a micro RF Jack terminal contact. Embodiments of semi-custom examples of separable connector 10 are not limited to these terminal contact types and configurations and may include any of the components described above with respect to FIGS. 1A-1C.

FIG. 2B illustrates an embodiment of the current disclosure utilizing a detachable coupling mechanism to secure the first modular component 14 to the second modular component 16. The attachment mechanism may provide rigidity to the separable connector 10 prior to receiver attachment. In some embodiments, the detachable coupling mechanism may utilize a plurality of coupling mechanism reception pieces 38 located on a first coupling side 40 of one of the modular components 14, 16. Generally, these coupling mechanism reception pieces are a recessed female component designed to accept (i.e., latch) a mated male component within its construction. In some embodiments, a plurality of coupling mechanism reception pieces 38 are configured to receive coupling mechanism attachment pieces 42 on a second coupling side 44 of one of the opposing modular components 14, 16. It will be appreciated that, while FIG. 2B depicts two coupling mechanism attachment pieces 42 received by two coupling mechanism reception pieces 38, there may be any quantity of coupling mechanism attachment pieces located along the coupling side for securing modular components 14, 16 together. FIG. 2C provides a separate back view of the attached modular components 14, 16 coupled at the first and second coupling sides 40, 44 via a latching mechanism securing the reception pieces 38 and the attachment pieces 42 together.

FIGS. 3A-3F depict the front face of alternative embodiments of separable connectors. Such embodiments illustrate combinations of separable connector 10 features, including variations of modular components 14, 16 (i.e., shape, size, terminal contact type, terminal contact quantity, terminal contact layout, etc.). Notably, separable connector 10 may include any of the components, including, but not limited to, terminal contact type, terminal contact quantity, terminal contact orientation and layout, modular component shape, and modular component quantity, described above with respect to FIGS. 1A-1C and FIGS. 2A-2C.

Figure 3A:
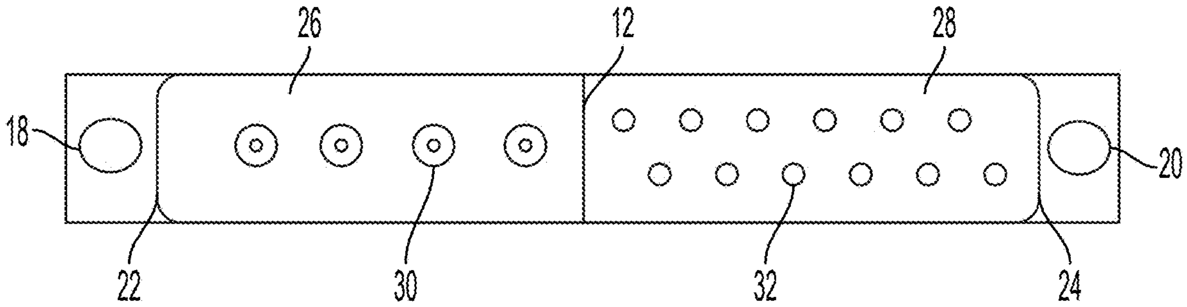
FIG. 3A depicts a front perspective view of the separable connector including an alternative front face with two modular components.

FIG. 3A illustrates a view of the coupled front connector faces 26, 28 of a semi-custom example of separable connector 10. In the depicted embodiment of separable connector 10, break line 12 splitting the first modular component 14 and the second modular component 16 is wholly vertical and parallel to the outer edge of the first modular component 14 and to the outer edge of the second modular component 16. In some embodiments, first terminal contact 30 is a terminal type, and second terminal contact 32 is a differing terminal type. An embodiment exists, as shown, such that the first terminal contact 30 may be a micro-miniature RF jack type, and the second terminal contact 32 may be a D-subminiature connector type. It will be appreciated that any terminal contact types previously discussed or further disclosed herein may be used in any combination for a semi-custom example of separable connector 10. In some embodiments, terminal contacts 30, 32 may be of differing layouts and/or spatial alignments within their respective connector face 26, 28.

Figure 3B:
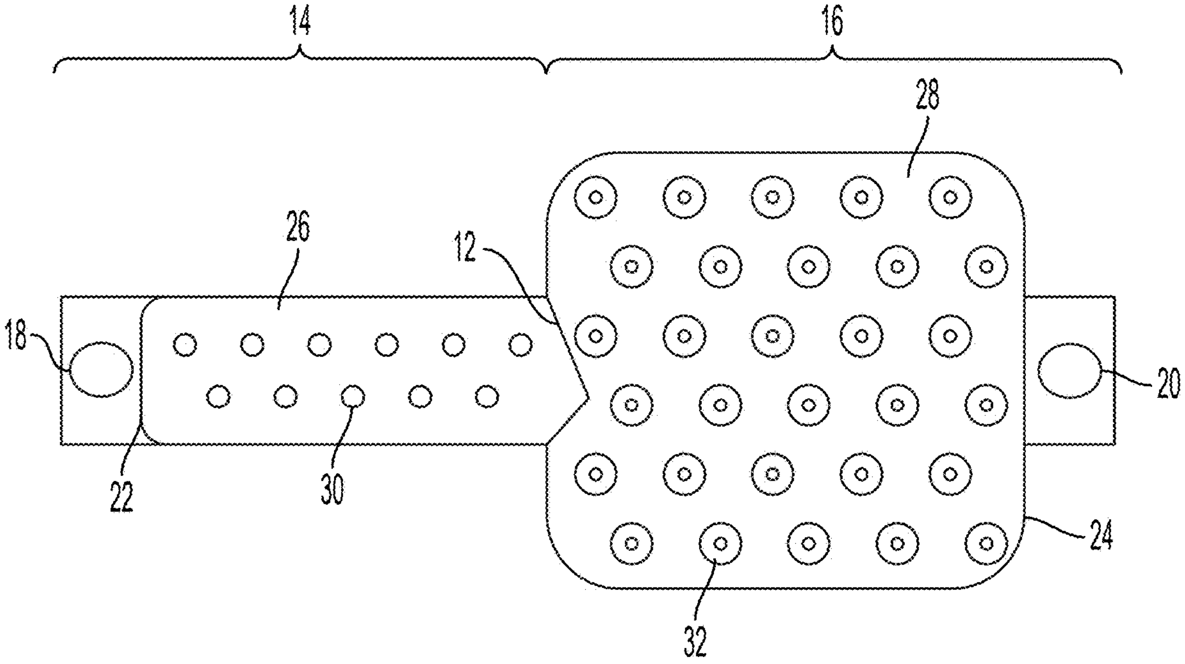
FIG. 3B depicts a front perspective view of another alternative front face of the separable connector with two modular components.

Turning now to FIG. 3B, an embodiment of separable connector 10 is depicted such that the modular components 14, 16 are of different sizes, in addition to different terminal contact quantities and layouts. As such, embodiments of separable connector 10 with modular components 14, 16 of different sizes compatibly coupled together asymmetrically at a break line 12 are within the scope herein.

Figure 3C:
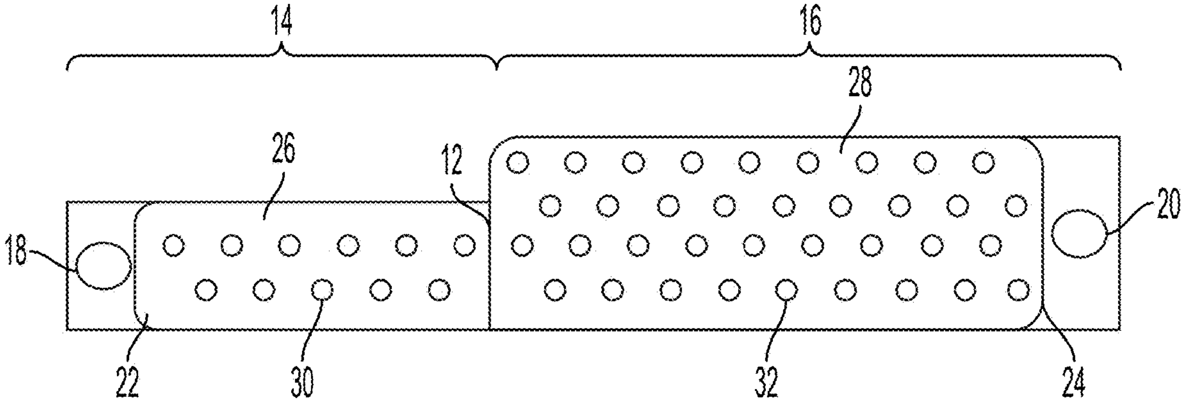
FIG. 3C depicts a front perspective view of another alternative front face of the separable connector with two modular components.

FIG. 3C depicts an embodiment of such size disparity between modular component 14, 16 with uniform terminal contact 30, 32 types. The second modular component 16 is the larger of the two modular components 14, 16, and features a greater quantity of terminal contacts present on and within the second housing 24. In some embodiments, modular components 14, 16 may have different dimensional sizes while maintaining similar geometric shape and proportions.

Figure 3D:
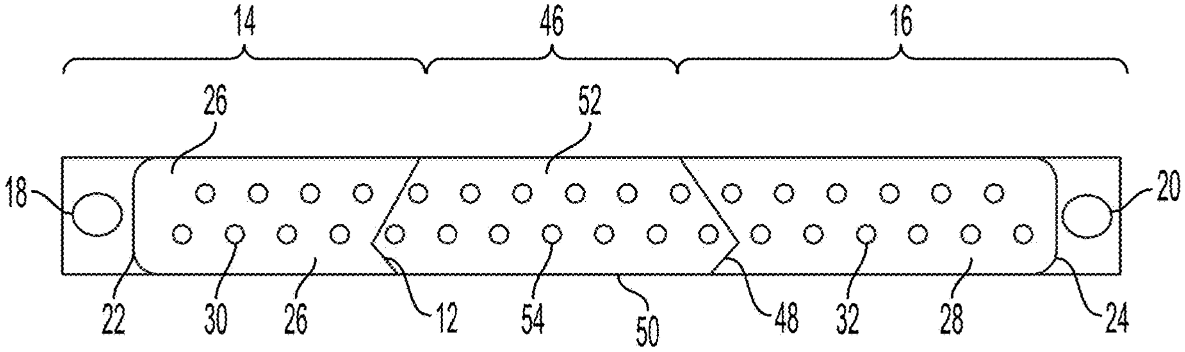
FIG. 3D depicts a front perspective view of the front face of the separable connector with three modular components.
Figure 3E:
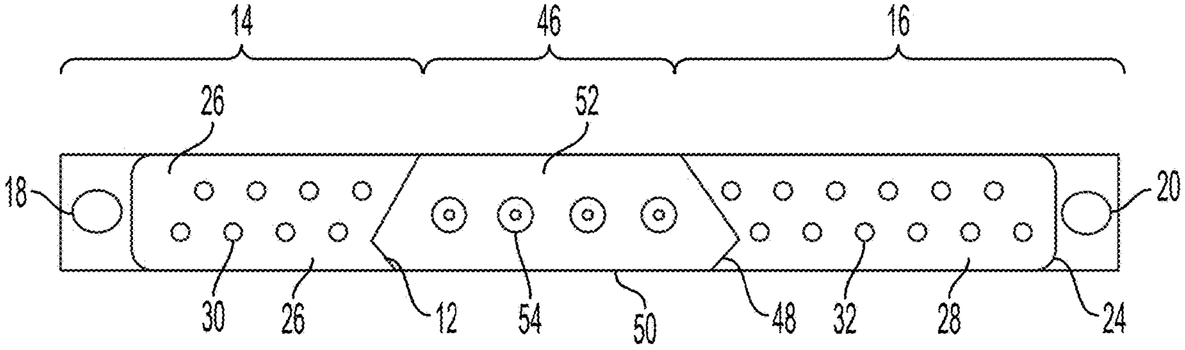
FIG. 3E depicts a front perspective view of an alternative front face of the separable connector with three modular components.

FIGS. 3D and 3E illustrate alternative embodiments of separable connector 10 with modular component quantities exceeding two components 14, 16. These figures depict embodiments with three modular components-a first modular component 14, a second modular component 16, and a third modular component 46, divisible at a first split and a second split. Specifically, the third modular component 46 is detachable from the first modular component 14 at break line 12 and from the second modular component 16 at a second break line 48. Similarly to the first and second modular components 14, 16, the third modular component 46 may have a third housing 50, a third connector face 52, a third terminal contact 54, and a third backshell (not shown). Notably, in some embodiments, the third modular component 46 may not have a unique mounting hardware feature as mounting will occur on the far sides of the separable connector 10 rather than at any interior location. This feature would be similarly missing from vertically stacked attached modular components, where mounting hardware may be located at a topmost point and a lowermost point of the attached modular components 14, 16, 46. It will be appreciated that some embodiments may include any number of modular components exceeding three components without departing from the scope herein. Similar to previously discussed FIGS. 3A-3B, embodiments of separable connector 10 with three or more modular components 14, 16, 46 may be semi-custom with different terminal contact 30, 32, 54 configurations (i.e., terminal contact type, terminal contact quantity, terminal contact layout, etc.) at connector faces 26, 28, 52 as shown in FIG. 3E.

Figure 3F:
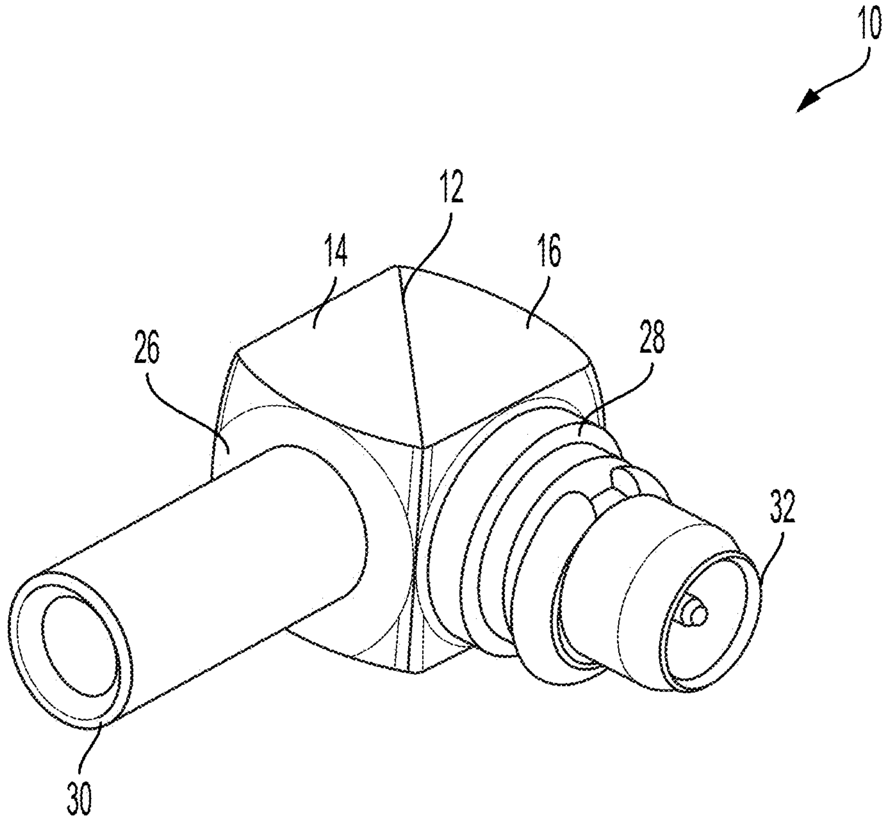
FIG. 3F depicts the separable connector with two modular components coupled coaxially.

Turning now to FIG. 3F, there exist some embodiments of a detachably couplable semi-custom example of separable connector 10 such that the individual connector faces 26, 28 are coaxial. In such embodiments, the terminal contacts 30 of a first modular component 14 may be oriented along a first axis while the terminal contacts 32 of a second modular component 16 may be oriented along a separate axis. Thus, in some embodiments, connection of the separable connector 10 to various electrical cables can occur at differing orientations along different axes. Such embodiments may be utilized within spatially constrained areas in which electrical cables access the space along different axes for various reasons, including electrical cable length or physical external constraints. In such instances, it is advantageous, if not critical, for establishing an electrical connection coaxially rather than making the electrical connection at a separable connector 10 with uniformly oriented faces 26, 28 of modular components 14, 16.

Figure 4A:
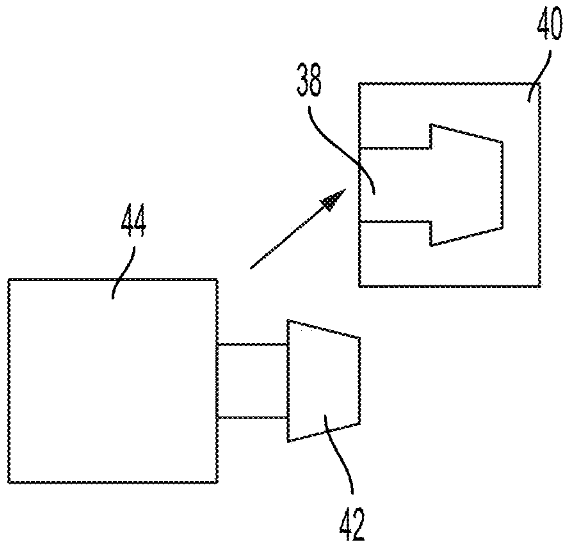
FIG. 4A depicts an attachment mechanism for detachable coupling of modular components including a plug with retention features.
Figure 4B:
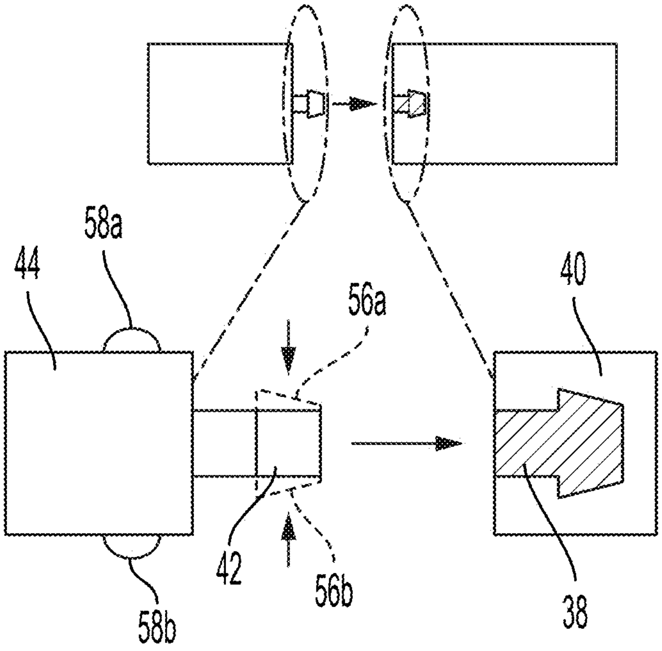
FIG. 4B depicts an attachment mechanism for detachable coupling of modular components including a flexible wing plug with quick release pins.

FIGS. 4A-4E depict various coupling methods for detachable connection of the modular components 14, 16. As previously discussed, in some embodiments, the separable connector 10 may comprise at least three modular components 14, 16, 46. It will be understood that such detachable coupling mechanisms described herein are applicable between more than just a first and second coupling side 40, 44 in embodiments with three or more modular components. The reception piece 38 is some female piece, such as a cavity or receptacle, configured to receive the attachment piece 42 of male configuration, such as a protrusion. In some embodiment attachment piece 42 may be a plug with retention features that can be snapped, latched, or otherwise adjoined into a reception piece 38 that is a partial cutout at the opposing coupling side 40 (see FIG. 4A). It will be appreciated that such plug is not limited to a trapezoidal configuration and may be of various other shapes with edges to ensure retention (i.e., triangular plugs, circular plugs, etc.). Moreover, a flexible plug, as illustrated in FIG. 4B, may be used for insertion along a differing axis than the plug depicted in FIG. 4A. In one embodiment, the plug may have flexible wings 56*a*, 56*b* defining the edges of the trapezoidal extension. These flexible wings 56*a*, 56*b* may retract when a quick release pin mechanism is engaged at a first and second structure 58*a*, 58*b* on the second coupling side 44. The flexible plug is then configured for insertion into a reception piece 38 that is a fully enclosed hole on coupling side 40.

Figure 4C:
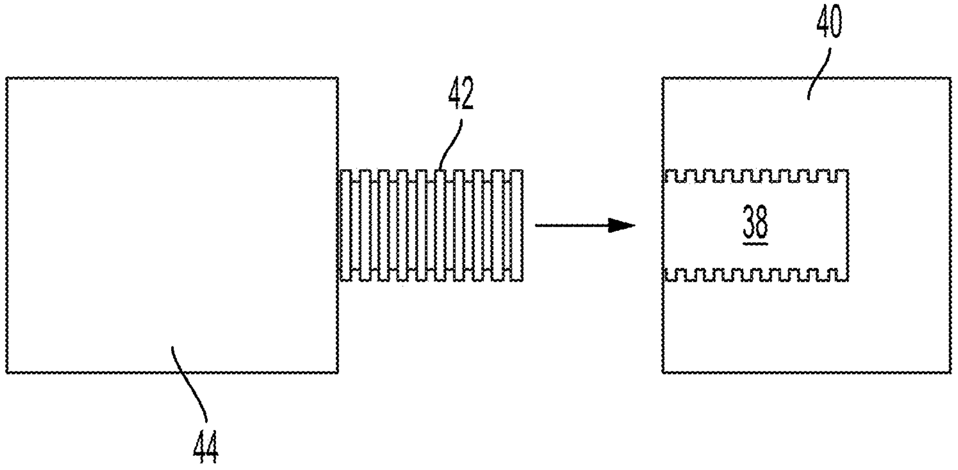
FIG. 4C depicts an attachment mechanism for detachable coupling of modular components including a screw.

FIG. 4C depicts a screw mechanism for coupling modular components 14, 16. In such embodiments, the attachment piece 42 extending from the second coupling side 44 is screwed into the reception piece 38 of first coupling side 40. It will be understood that embodiments of any such screwing mechanism may utilize a range of thread sizes and screw lengths without impacting the housing 22, 24 or electrical contacts of either the first or second modular component 14, 16.

Figure 4D:
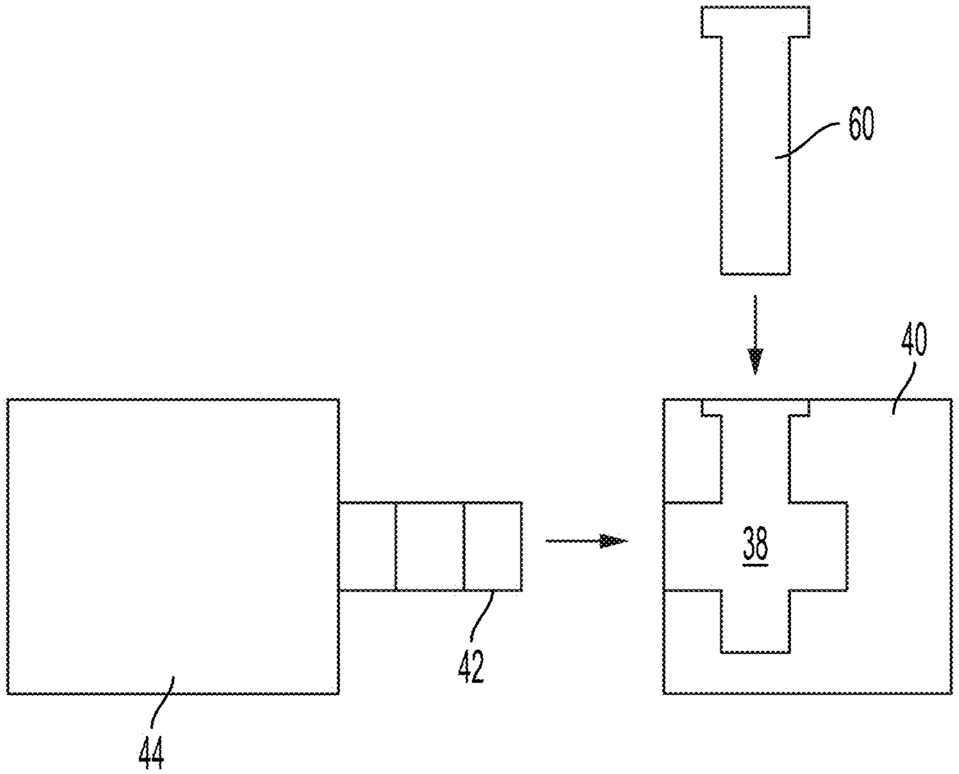
FIG. 4D depicts an attachment mechanism for detachable coupling of modular components including a tab and recess feature.
Figure 4E:
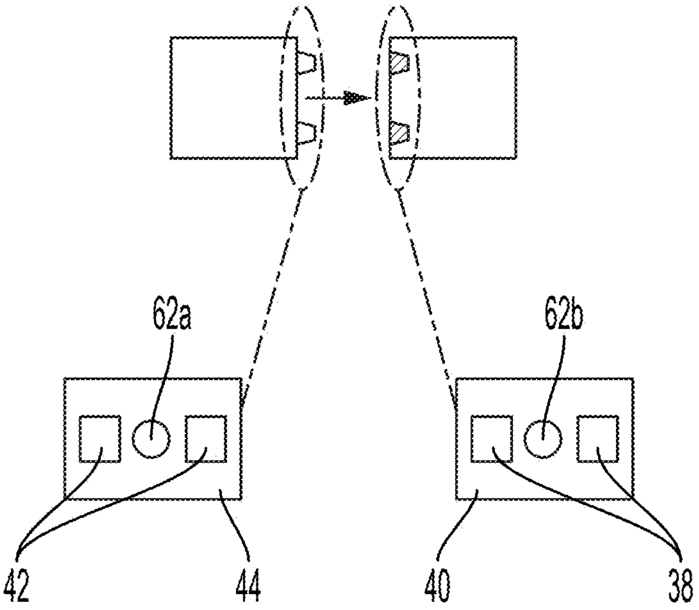
FIG. 4E depicts an attachment mechanism for detachable coupling of modular components including a magnet and stud combination.

Further, FIG. 4D illustrates a tab and recess mechanism for attachment. In such embodiments, the attachment piece 42 is a tab extending from coupling side 44 and containing a vertical recess within. As the tab is advanced into a reception piece 38, which is a multidirectionally accessed hole extending horizontally into the opposite coupling side 40 and vertically to a top surface of the modular component 14, the hole of the tab is aligned with the vertical extension portion of reception piece 38. A securing component 60, such as a solid pin, plug configuration, or other biasing mechanism, is inserted vertically into the reception piece 38 to secure modular components 14, 16 in proper alignment.

There exist some embodiments of the disclosed attachment mechanism that may use a combination of both reception pieces 38 and attachment pieces 42 at both the first coupling side 40 and the second coupling side 44. Accordingly, FIG. 4E similarly depicts a combination of studs and magnets for modular component 14, 16 attachment. In some embodiments, one or both of the two coupling sides 40, 44 may have reception pieces 38 that are recesses for receiving studs, herein the attachment pieces 42. The studs act as an alignment and positioning mechanism for the attachment, and a securement method is further employed to prevent unwanted decoupling of the modular components 14, 16. In some embodiments, this securement method may be a first magnet 62*a* located on the first coupling side 40 and a second magnet 62*b* located on the second coupling side 44. It will be understood that other mechanisms beyond magnetism may be used for securement including, but not limited to, a hook and loop fastener with one portion on the first coupling side 40 and the other portion on the second coupling side 44. Further, in some embodiments, a latching mechanism as depicted in FIG. 4A may comprise a unitary extension piece having both at least one attachment piece and at least one reception piece on both coupling sides 40, 44. To the extent that the previously discussed attachment mechanisms did not disclose a combination of reception pieces 38 and attachment pieces 42 along a single coupling side, it will be appreciated that such combinations may be used for the disclosed mechanisms without deriving from the disclosure herein.

Figure 5:
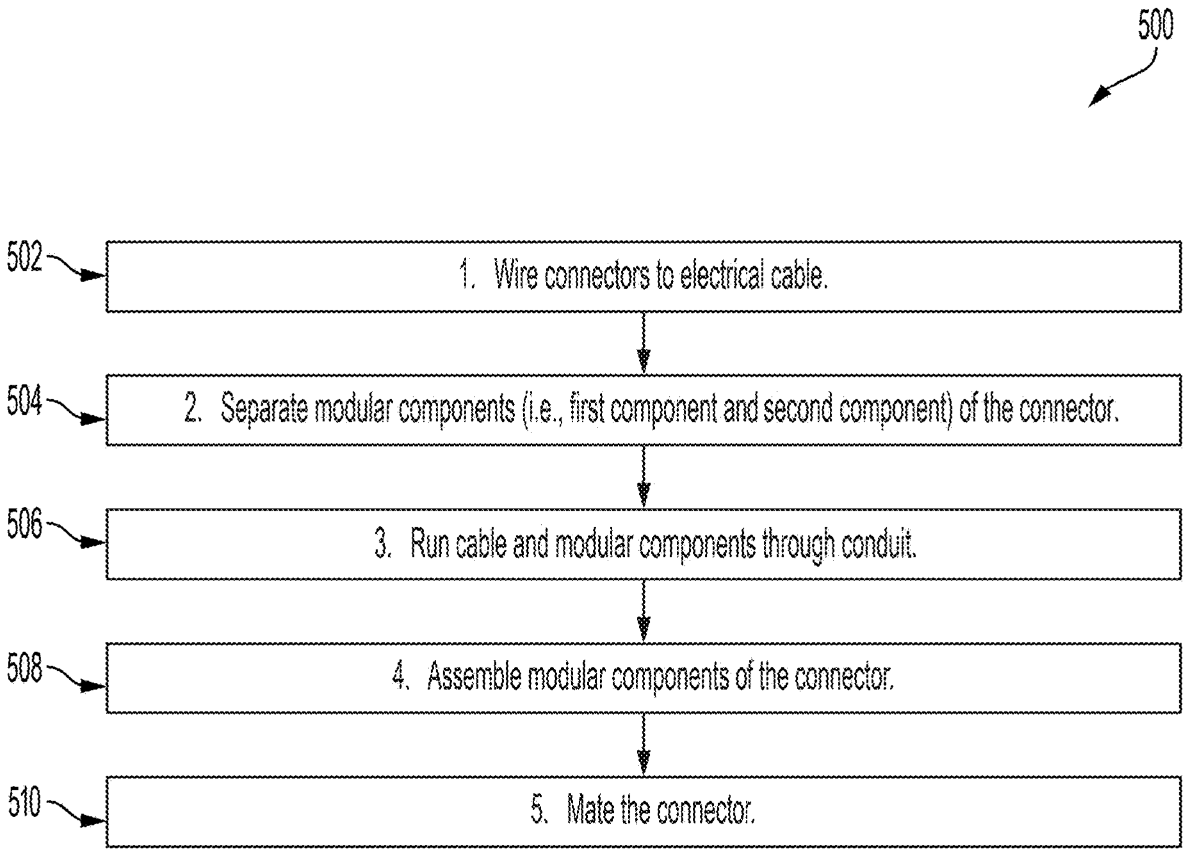
FIG. 5 depicts a flow diagram illustrating an exemplary method of assembling and routing the separable connector through a conduit.

FIG. 5 illustrates a method 500 of using a separable connector 10 in accordance with embodiments of the present disclosure. Method 500 may include connecting a modular component 14, 16 with a cable to form a connector-cable assembly (not shown) and routing the connector-cable assembly. While method 500 is discussed with respect to routing a separable connector 10 through a conduit, it will be appreciated that alternative routing (i.e., routing through other apertures or external to an enclosure) is in accordance with the scope of the present disclosure. The process illustrated herein may allow for the use of larger standard connectors in applications where space constraints would typically prohibit their use, and, further, the process may provide flexibility in cable installation and connector usage. This approach may be particularly beneficial in retrofit applications where existing apertures or conduits cannot be enlarged or in new designs where space optimization is critical.

Method 500 may begin at step 502, where a separable connector 10, in which the first modular component 14 is coupled, latched, connected, or otherwise adjoined to at least a second modular component 16, is wired to the electrical cable.

Next, at step 504, the individual modular components 14, 16 of the separable connector 10 may be detached or otherwise separated for independent manipulation. The detachment of the modular components from their previous state of coupling, throughout which process the cables stay connected to the modular components, establishes a modular component-cable assembly prepared in its entirety.

Subsequently, at step 506, the attached cables and separable connector modular component assemblies may be run individually through the conduit, aperture, or other enclosed space. In some embodiments, routing the modular connector assemblies through the conduit or aperture will involve attachment of a pull-string or additional wire to the modular component-cable assembly. Following sufficient attachment of the pull-string or wire, the modular component-cable assembly is pulled through the conduit to facilitate movement towards the desired position at the end of the conduit. In some embodiments, this end position will extend beyond the distal end of the aperture of the conduit or of an alternative enclosure. It will be appreciated that other methods of routing the modular connector assemblies through the conduit may be utilized to achieve a similar movement of the modular component-cable assembly.

Next, at step 508, the modular components 14, 16 of the separable connector 10 may be reassembled by coupling at the first coupling side 40 and the second coupling side 44 via an attachment mechanism. Such attachment mechanisms utilize some combination of at least one reception piece 38 to receive at least one attachment piece 42 along the coupling sides 40, 44. This step 108 creates a now unitary, but still detachable, reassembled separable connector-cable assembly. As previously discussed, this connector-cable assembly step can occur for separable connector 10 with any number of modular components.

Finally, at step 510, the separable connector in its full connector-cable assembly may be mated to a receiver or other downstream electrical system component. At this point, mounting hardware features 18, 20 may be utilized if advantageous to secure the separable connector-cable assembly to the receiver or other connection.

Figure 6:
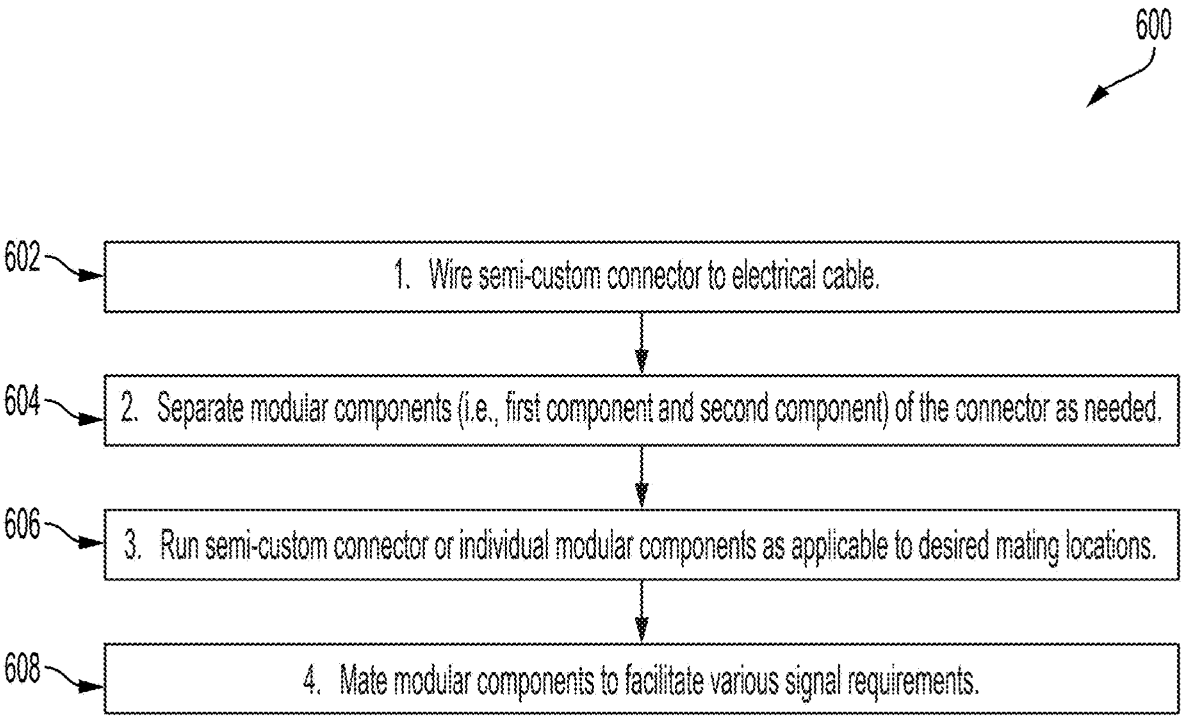
FIG. 6 depicts a flow diagram illustrating an exemplary method of assembling and routing the semi-custom connector.

FIG. 6 illustrates a method 600 of using a semi-custom separable connector 10 in accordance with embodiments of the present disclosure. Method 600 may include connecting a semi-custom separable connector 10 having distinct signal type connections to facilitate various signal requirements. In some embodiments, these signal types may be utilized for high-speed data transmission signals and include terminal contact types such as USB Type-C, Thunderbolt, or HDMI terminal contacts 30, 32. In some embodiments, the signal type may be a power type. Still further electrical connections previously disclosed such as push-pull connectors, high-density D-subminiature connectors, RF jack connectors, and circular connectors are within the scope of at least one of the components consistent with embodiments herein.

Method 600 may begin at step 602, where a semi-custom separable connector 10 may be wired to electrical cable. The semi-custom separable connector 10 may comprise a first signal type and a second signal type on a first modular component 14 and a second modular component 16, respectively. As in the standard separable connector, there may be more than two modular components 14, 16 and, thus, greater than two signal types that the semi-custom separable connector 10 may effectively be connected to.

Next, at step 604, modular components 14, 16 may be separated as needed to advance the semi-custom separable connector 10 to desired signal requirement connection points. In some embodiments, it may not be necessary to separate the semi-custom separable connector 10 into a first modular component 14 and a second modular component 16 in order to run the connector 10 to downstream signal mating locations; however, the separable nature of the connector allows for such step within the method. In some embodiments, the decoupling of modular components 14, 16 may be required to ensure the semi-custom separable connector 10 may be advancing through spatially constrained areas or to facilitate mating the modular components 14, 16 at downstream signal mating locations which are not directly adjacent to each other.

Subsequently at step 606, the semi-custom separable connector 10 or, following decoupling of the modular components 14, 16, the individual modular components 14, 16 may be run to the desired mating locations. If the modular components 14, 16 a decoupled, they may now by reattached if dictated by the location at which they mate and the proximity of the now mated first component 14 and second component 16 to each other.

Finally, at step 608, the modular components may be mated to a plurality of receivers or downstream electrical system components corresponding with the quantity and type of signal types on the modular components. As such, the semi-custom separable connector 10 may be utilized to facilitate the various signal requirements described at method 600.

Features described above, as well as those claimed below, may be combined in various ways without departing from the scope hereof. The following examples illustrate some possible, non-limiting combinations:

Clause 1. A separable connector for coupling electrical cables, the separable connector comprising: a first component; a second component; and an attachment mechanism, wherein the attachment mechanism detachably couples the first component to the second component of the separable connector.

Clause 2. The separable connector of clause 1, wherein the first component comprises a first terminal contact layout.

Clause 3. The separable connector of clause 1 or clause 2, wherein the second component comprises a second terminal contact layout.

Clause 4. The separable connector of any of clauses 1-3, further comprising: a first housing configured to at least partially contain the first terminal contact layout, the first terminal contact layout further comprising: at least one first terminal contact.

Clause 5. The separable connector of any of clauses 1-4, and a second housing configured to at least partially contain the second terminal contact layout, the second terminal contact layout further comprising: at least one second terminal contact.

Clause 6. The separable connector of any of clauses 1-5, wherein the at least one first terminal contact and the at least one second terminal contact are a same terminal contact type.

Clause 7. The separable connector of any of clauses 1-6, wherein the at least one first terminal contact is one of a plurality of first terminal contacts.

Clause 8. The separable connector of any of clauses 1-7, wherein each terminal contact of the plurality of first terminal contacts is equally spaced on the first housing.

Clause 9. The separable connector of any of clauses 1-8, wherein the at least one second terminal contact is one of a plurality of second terminal contacts.

Clause 10. The separable connector of any of clauses 1-9, wherein each terminal contact of the plurality of second terminal contacts is equally spaced on the second housing.

Clause 11. The separable connector of any of clauses 1-10, wherein the first terminal contact layout comprises a first row on the first housing.

Clause 12. The separable connector of any of clauses 1-11, wherein the second terminal contact layout comprises a second row on the second housing.

Clause 13. The separable connector of any of clauses 1-12, wherein the attachment mechanism further comprises: an attachment component on a first coupling side; and a reception component on a second coupling side.

Clause 14. The separable connector of any of clauses 1-13, wherein the reception component is configured to receive at least a portion of the attachment component within the second coupling side.

Clause 15. A semi-custom and separable connector system, the system comprising: a first modular component, the first modular component comprising: a first terminal contact layout; and a first side comprising a first attachment configured for selective attachment; a second modular component, the second modular component comprising: a second terminal contact layout; and a second side comprising a second attachment configured to receive the first attachment of the first side of the first modular component to selectively attach the first modular component to the second modular component, wherein the first terminal contact layout is distinct from the second terminal contact layout.

Clause 16. The system of clause 15, further comprising: a first housing, the first housing comprising a first face, wherein the first face is offset from a first surface of the first modular component.

Clause 17. The system of clause 15 or clause 16, further comprising: a second housing, the second housing comprising a second face, wherein the second face is offset from a second surface of the second modular component.

Clause 18. The system of any of clauses 15-17, wherein the first terminal contact layout further comprises: at least one terminal contact pin, wherein the at least one terminal contact pin is housed at least partially within the first housing, and wherein the at least one terminal contact pin extends distally beyond a connector face.

Clause 19. The system of any of clauses 15-18, wherein the second terminal contact layout further comprises: at least one terminal contact socket, wherein the at least one terminal contact socket is housed at least partially within the second housing.

Clause 20. The system of any of clauses 15-19, further comprising: a third modular component, the third modular component comprising: a third terminal contact layout.

Clause 21. The system of any of clauses 15-20, further comprising a third side configured to receive the second side of the second modular component at the third modular component.

Clause 22. The system of any of clauses 15-21, wherein the third side is configured to detachably couple to the second side to mate the third modular component to the second modular component.

Clause 23. The system of any of clauses 15-22, wherein the third terminal contact layout is distinct from the second terminal contact layout.

Clause 24. The system of any of clauses 15-23, wherein the third terminal contact layout is distinct from the first terminal contact layout.

Clause 25. The system of any of clauses 15-24, wherein the third terminal contact layout further comprises one of at least one terminal contact pin or at least one terminal contact socket.

Clause 26. A method for assembling and routing a separable connector comprising: providing a first modular component and a second modular component of the separable connector, wherein the first modular component comprises: a first surface; a first terminal contact layout; and a first side configured to detachably couple to the second modular component; wherein the second modular component comprises: a second surface; a second terminal contact layout; and a second side configured to detachably couple to the first modular component; routing the first modular component and the second modular component through a conduit; once the first modular component and the second modular component are routed through the conduit, coupling the first modular component to the second modular component by an attachment mechanism.

Clause 27. The method of clause 26, wherein the attachment mechanism further comprises: a male mating component; and a female mating component.

Clause 28. The method of clause 26 or clause 27, wherein assembling the first modular component and the second modular component further comprises: inserting the male mating component into the female mating component at least at one of the first side and the second side.

Clause 29. The method of any of clauses 26-28, wherein assembling the first modular component and the second modular component further comprises: securing the male mating component within the female mating component via a securing mechanism.

Clause 30. The method of any of clauses 26-29, wherein the securing mechanism is one of a screw, a magnet, a snap, a tab and recess, a biasing pin, or a plug.

Clause 31. The method of any of clauses 26-30, further comprising: prior to routing the first modular component through the conduit, wiring an electrical cable to the first modular component and the second modular component.

Clause 32. The method of any of clauses 26-31, wherein the separable connector is a semi-custom separable connector, and wherein the first terminal contact layout is distinct from the second terminal contact layout.

Although the invention has been described with reference to the embodiments illustrated in the attached drawing figures, it is noted that equivalents may be employed, and substitutions made herein without departing from the scope of the invention.

Having thus described various embodiments of the disclosure, what is claimed as new and desired to be protected by Letters Patent includes the following:

1. A separable connector for routing one or more electrical cables within a conduit, comprising:
- a first modular component configured to couple to a first portion of the one or more electrical cables, the first modular component comprising:
  - a first terminal contact layout;
- a second modular component configured to couple to a second portion of the one or more electrical cables, the second modular component comprising:
  - a second terminal contact layout,
- wherein the first modular component and the second modular component are configured to run individually therethrough the conduit to route the one or more electrical cables within the conduit; and
- an attachment mechanism configured to detachably couple the first modular component to the second modular component after the first modular component and the second modular component are individually run through the conduit.

2. The separable connector of claim 1, further comprising:
- a first housing configured to at least partially contain the first terminal contact layout, the first terminal contact layout further comprising:
  - at least one first terminal contact; and
- a second housing configured to at least partially contain the second terminal contact layout, the second terminal contact layout further comprising:
  - at least one second terminal contact.

3. The separable connector of claim 2,
- wherein the at least one first terminal contact and the at least one second terminal contact are a same terminal contact type.

4. The separable connector of claim 3,
- wherein the at least one first terminal contact is one of a plurality of first terminal contacts,
- wherein each terminal contact of the plurality of first terminal contacts is equally spaced on the first housing.

5. The separable connector of claim 3,
- wherein the at least one second terminal contact is one of a plurality of second terminal contacts,
- wherein each terminal contact of the plurality of second terminal contacts is equally spaced on the second housing.

6. The separable connector of claim 2,
- wherein the first terminal contact layout comprises a first row on the first housing,
- wherein the second terminal contact layout comprises a second row on the second housing.

7. The separable connector of claim 1, wherein the attachment mechanism further comprises:
- an attachment component on a first coupling side; and
- a reception component on a second coupling side,
- wherein the reception component is configured to receive at least a portion of the attachment component within the second coupling side.

8. A semi-custom separable connector system for routing one or more electrical cables within a conduit, comprising:
- a first modular component configured to couple to a first portion of the one or more electrical cables, the first modular component comprising:
  - a first terminal contact layout; and
  - a first side;
- a second modular component configured to couple to a second portion of the one or more electrical cables, the second modular component comprising:
  - a second terminal contact layout; and
  - a second side configured to selectively couple to the first side of the first modular component via an attachment mechanism,
- wherein the first modular component and the second modular component are configured to run individually therethrough the conduit to route the one or more electrical cables within the conduit,
- wherein the attachment mechanism is configured to selectively attach the first modular component to the second modular component after the first modular component and the second modular component are individually run through the conduit, and
- wherein the first terminal contact layout is distinct from the second terminal contact layout.

9. The semi-custom separable connector system of claim 8, further comprising:
- a first housing, the first housing comprising a first face,
- wherein the first face is offset from a first surface of the first modular component; and
- a second housing, the second housing comprising a second face, wherein the second face is offset from a second surface of the second modular component.

10. The semi-custom separable connector system of claim 9, wherein the first terminal contact layout further comprises:

at least one terminal contact pin, wherein the at least one terminal contact pin is housed at least partially within the first housing, wherein the at least one terminal contact pin extends distally beyond a connector face.

11. The semi-custom separable connector system of claim 9, wherein the second terminal contact layout further comprises:

at least one terminal contact socket housed at least partially within the second housing.

12. The semi-custom separable connector system of claim 8, further comprising:

a third modular component, the third modular component comprising:

a third terminal contact layout; and a third side configured to receive the second side of the second modular component, wherein the third terminal contact layout is distinct from the second terminal contact layout, wherein the third side is configured to detachably couple to the second side to mate the third modular component to the second modular component.

13. The semi-custom separable connector system of claim 12, wherein the third terminal contact layout is distinct from the first terminal contact layout.

14. The semi-custom separable connector system of claim 12, wherein the third terminal contact layout further comprises one of at least one terminal contact pin or at least one terminal contact socket.

15. A method for utilizing a separable connector to route one or more electrical cables within a conduit, comprising:

attaching the separable connector to the one or more electrical cables at a first modular component and a second modular component, wherein the first modular component comprises:

a first terminal contact layout; and a first side, and wherein the second modular component comprises:

a second terminal contact layout; and a second side configured to detachably couple to the first side of the first modular component via an attachment mechanism;

individually running the first modular component and the second modular component through the conduit to route the one or more electrical cables within the conduit; and once the first modular component and the second modular component are run through the conduit, detachably coupling the first modular component to the second modular component.

16. The method of claim 15, wherein the attachment mechanism further comprises:

a male mating component; and a female mating component.

17. The method of claim 16, wherein assembling the first modular component and the second modular component further comprises:

inserting the male mating component into the female mating component at least at one of the first side and the second side; and securing the male mating component within the female mating component via a securing mechanism.

18. The method of claim 17, wherein the securing mechanism is one of a screw, a magnet, a snap, a tab and recess, a biasing pin, or a plug.

19. The method of claim 15, further comprising:

upon detachably coupling the first modular component to the second modular component, mating at least one of the first modular component or the second modular component to a receiver.

20. The method of claim 15, wherein the separable connector is a semi-custom separable connector, wherein the first terminal contact layout is distinct from the second terminal contact layout.

* * * * *